United States Patent [19]

Ladehoff

[11] Patent Number: 4,658,530
[45] Date of Patent: Apr. 21, 1987

[54] DECOY WITH PLUG-IN LEG ASSEMBLY

[76] Inventor: Arthur W. Ladehoff, 518 N. 9th St., Clinton, Iowa 52732

[21] Appl. No.: 835,192

[22] Filed: Mar. 3, 1986

[51] Int. Cl.$^4$ .............................................. A01M 31/06
[52] U.S. Cl. .............................................. 43/3; 446/97
[58] Field of Search ...................... 43/2, 3; 446/97, 99, 446/100

[56] References Cited

U.S. PATENT DOCUMENTS

| | | |
|---|---|---|
| 1,211,590 | 1/1917 | Kennedy ................................... 43/2 |
| 1,714,558 | 5/1929 | Hauff ........................................ 43/3 |
| 2,622,360 | 12/1952 | Bertram .................................... 43/3 |
| 2,816,384 | 12/1957 | Rexius ...................................... 43/3 |
| 3,435,550 | 4/1969 | Carlson ..................................... 43/3 |
| 4,356,659 | 11/1982 | Clarke ..................................... 446/97 |
| 4,512,749 | 4/1985 | Deulofeu ................................. 446/321 |

Primary Examiner—Nicholas P. Godici
Assistant Examiner—Karen Skillman
Attorney, Agent, or Firm—Glenn H. Antrim

[57] ABSTRACT

A decoy for a fowl has a large socket in the bottom of a moderately flexible body and a mating plug on a removable two-legged foot assembly, the plug and socket being shaped to distribute weight and force from wind and to interlock for firm connection. Preferably, the socket is a recess in the moderately flexible material of the body, and the plug supported by two legs is quite rigid. Protrusions on the side of the socket fit into corresponding notches within the inside surface of the socket.

4 Claims, 5 Drawing Figures

DECOY WITH PLUG-IN LEG ASSEMBLY

BACKGROUND OF THE INVENTION

This invention relates to hunters' decoys with removable leg supports and particularly to decoys with plug-in-socket arrangements for securely fastening respective two-legged supports.

Decoys resembling fowl often have hollow bodies with open bottoms or have closed, flexible, inflated bodies. Within the bottoms of the inflatable bodies, cylindrical seats have been provided for receiving separate rods for legs. The lower ends of the legs may be sharpened to be pushed into the ground, or a separate wire or thin rod attached to each body may extend downward between a pair of legs for staking the decoy. In U.S. Pat. No. 2,816,384 issued to A. Rexius on Dec. 17, 1957, the upper ends of legs are joined by a cross member, and a U-shaped wire extends horizontally from the top of the central portion of the cross member. The U-shaped member slides into a track in a plate that is attached to the body of a decoy. Decoys of these types are generally quite satisfactory but often do not appear to be very realistic, and even though they are staked, the supports are not usually firm enough to keep the decoys in place when exposed to strong wind.

SUMMARY OF THE INVENTION

The present decoy has a bottom portion of moderately flexible material, and a recess formed in the bottom portion functions as a socket. A two-legged supporting assembly according to this invention has an upper portion shaped as a plug to fit tightly into the socket. To provide rigidity, the molded material of the leg assembly is quite rigid. The upper ends of the two legs are usually fastened permanently at spaced points to the bottom of the plug, and the lower ends of the legs are formed to snap tightly into seats of a base. The base is preferably a single molded part comprising a pair of over-size feet joined by a pair of spaced parallel bars. The decoy will usually remain in place when positioned on the ground, but to retain the decoy during windy periods, apertures are provided through the bars for staking the feet to the ground by stiff wires.

The upper portion of the body of the decoy may be fabricated from rigid materials or from materials having various degrees of flexibility, and the moderately flexible bottom portion for the socket may be molded into the bodies or be cemented to the bodies. Preferably, the body and the socket are molded simultaneously of moderately flexible material, the body being hollow and the material having sufficient rigidity such that the body maintains its shape without air pressure. For transportation and storage, the preferred body can be squeezed flat and can be manipulated back into shape for use either with or without air pressure.

DESCRIPTION OF THE PREFERRED EMBODIMENT

Figure 1:
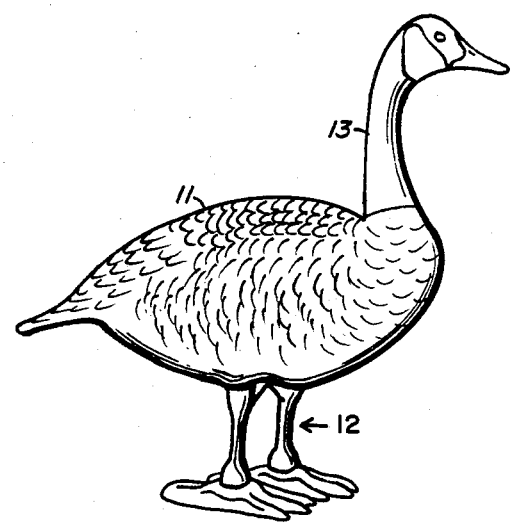
FIG. 1 is a side view of a goose decoy supported by a leg assembly according to this invention.

Other than having oversized feet, a decoy of FIG. 1 with the two-legged foot assembly 12 of this invention is a realistic resemblance of a goose. Even though the bottom of the body 11 needs to be of moderately flexible material to receive the removable leg assembly 12, the rest of the body may range in flexibility from soft material to be inflated to rigid material. In a preferred embodiment, advantages are obtained by having the entire body fabricated from moderately flexible, low-density polyethylene. The mold in which the body is formed is derived from a carved wooden sculpture, and reproductions are molded by a usual process. Beads of polyethylene are heated; formed into a tube; the tube is injected into a mold; and then the hot tube is pressed outward by air pressure against the interior wall of the mold.

The body of moderately flexible polyethylene is desirable because the body and the recess for receiving the leg assembly 12 can be formed simultaneously, and desirable features are obtained. The body is self-supporting and still can be squeezed flat for transportation and storage, can be returned to its normal shape by manipulation either with or without inflation by breath. Since the body is self-supporting and the two-legged assembly of this invention provides firm support, the preferred decoy of FIG. 1 will remain standing in spite of exposure to strong gusts of wind and shot.

Before compressing the body 11, a head assembly 13 and the feet assembly 12 are removed. To facilitate the removal of these assemblies, a recess for each of the assemblies is molded into the body 11. The recess (not shown) for the head assembly 12 has a circumferential groove with a vertical notch for receiving a radial protrusion from the lower end of the neck of the head assembly 13. The vertical notch from the outer edge of the recess to the groove provides passageway for the protrusion during assembly or during removal while the head assembly 13 is rotated a certain amount from its normal position.

Figure 2:
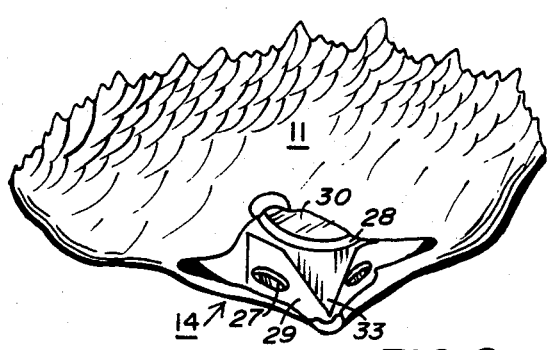
FIG. 2 is an exploded view of the bottom portion of the body and the leg assembly.
Figure 3:
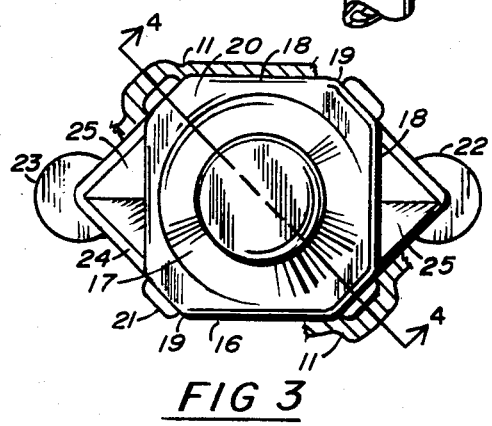
FIG. 3 is a top view of the leg assembly of FIG. 2.

The shape of the interior surface about the other recess or socket 14 shown in FIG. 2 may be more easily understood after an understanding of the shape of the tightly fitting, outer surface of an upper portion or plug 15 of the leg assembly 12. To provide desired rigidity, the leg assembly 12 is molded from high-density polyethylene. Preferably to facilitate molding and to provide firm connection and support, the plug 15 as viewed in cross section has a polygonial lower portion 16 and a truncated conical upper portion 17. The lower portion 16 has substantial height, and to facilitate molding, the sides are as usual tapered inward slightly from bottom to top. In a preferred assembly, the cross-sectional shape is generally octagonal with alternate sides being the same size, each of four sides 18 being substantially longer horizontally than each of the other four sides 19. The base of the upper conical portion 17 has a diameter slightly less than the width of the polygonal portion 16 and is centered over the portion 16 to provide a shoulder 20 on the top of the polygonal portion 16 about the base of the conical portion 17. Each of the shorter sides 19 has a central horizontal protrusion 21, each protrusion being rectangular in cross section and having rounded outer edges.

A pair of legs 22 and 23 with round cross sections have upper ends molded to the lower sides of respective ledges 24, the ledges extending horizontally outward from the plug 15. The tops of the ledges 24 are approximately equilateral triangles, and the bases are along the bottom of the plug 15 below respective opposite longer sides 18. The legs 22 and 23 extend downward from the outer portions of the triangular ledges 24, the upper ends of each of the legs being below the outer apexes of the respective ledges 24. Each of the ledges 24 is also reinforced by a molded tetrahedral portion 25, a lower side of each portion 25 being in the plane of the upper surface of the respective ledge 24 and a somewhat smaller vertical side being a portion of a respective longer side 18 of the polygonal portion 16. The two remaining sides are equilateral and extend from the top edge of the respective longer side 18 to an apex positioned a short distance inward from the apex of a respective ledge 24. The recess 14 for receiving the plug 15 has lateral portions with triangular cross sections for receiving tightly the respective portions 25 to contribute to retention of the shape of the body 11 while exposed to strong wind.

Figure 4:
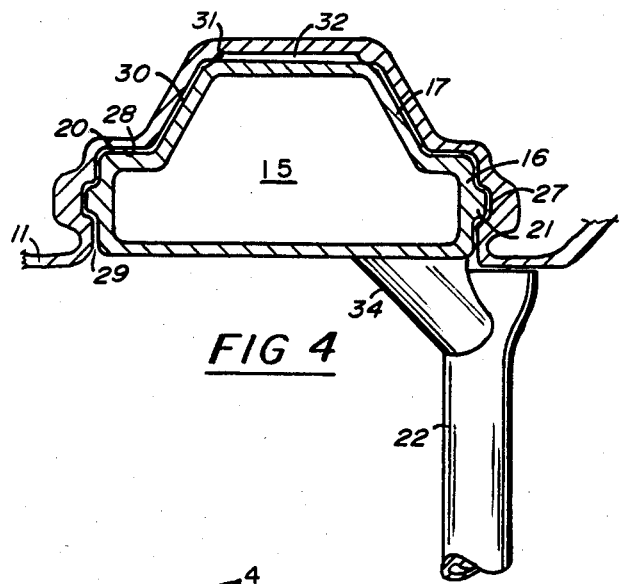
FIG. 4 is a fragmentary cross-sectional view of the lower portion of the body and the upper portion of the leg assembly on the line 4—4 of FIG. 3.

The inside surface of the socket 14 as shown in FIG. 2 is shaped to conform closely about the top and sides of the plug 15. Each of the short sides of an octagonal shaped lower portion 29 of the recess has a central horizontal notch with sufficient length and only slightly greater width than that required for receiving a corresponding protrusion 21. An inside shoulder 28 against which the shoulder 20 of the plug 15 bears is formed between the lower portion 29 of the socket 14 and an upper conical portion 30. The portion 31 (FIG. 4) adjacent the perimeter of the top of the upper portion 30 of the recess 14 bears against the top of the conical portion 17 of the plug 15. If desired, a little space may be left above the enclosed central portion.

The protrusions 21 and the notches 27 are located such that the protrusions snap into the corresponding notches as the plug 15 is fully inserted such that the outside shoulder 20 of the plug 15 contacts the inside shoulder 28 of the socket 14. Although the body 11 is moderately flexible, the plug 15 distributes forces to provide a stiff spring support for the body 11 on the plug 15. The depth of the plug 15 provided by the upper conical portion 17 aids in resisting motion and distortion about horizontal axes, and in addition the lateral tetrahedral portions 25 resist lateral sway. The socket 14 has lateral portions 33, each having an inverted V-shape extending radially outward with an upper corner slanting downward to receive tightly the corresponding tetrahedral reinforcing portion 25. As the rigid plug 15 is inserted into the socket 14, the four protrusions 21 force portions of the socket 14 adjacent points of contact with the protrusions 21 outward until the plug 15 is fully inserted. When the protrusions 21 are opposite the corresponding notches 27, the distorted areas of the portion 29 of the recess snap into normal positions. To remove the plug 15, greater force is required to remove the protrusions 21 from the notches 27 than would be encountered in normal use.

The ledges 24 and the legs 22 and 23 are reinforced by respective angular molded portions 34 (FIG. 4) extending between the upper part of the respective leg 22 or 23 and an adjacent portion of the bottom of the polygonal portion 16. Each reinforcing portion 34 has a rounded lower surface that extends slantingly upward and inward from a respective leg at a level somewhat below the upper end of the leg to the bottom portion of the plug 15 terminating about two-thirds of the distance from the leg to the center of the bottom portion.

The lower ends of the legs 22 and 23 (FIG. 2) snap tightly into seats 35 and 36 (FIG. 5) of the feet 37 and 38 respectively. Each of the seats 35 and 36 are like a countersunk hole in that an upper portion has a greater diameter than a concentric lower portion. The lower end of each of the legs 22 and 23 terminate in two successive cylindrical portions of successive smaller diameters. The lower portions 39 fit tightly into the lower portions of the respective seats 35 and 36. Preferably, the extreme lower end 40 of each portion 39 is expanded a small amount to snap tightly through that portion of a seat 35 or 36 with a minimum diameter. Obviously, shoulders are formed by the portions 39 and 41; while assembled, the upper shoulder of each leg 22 or 23 rests on top of a respective foot 37 or 38 about the seat 35 or 36, and the lower shoulder between portions 39 and 41 rests on a shoulder at the lower end of the countersunk portion of the respective seat 35 or 36.

Figure 5:
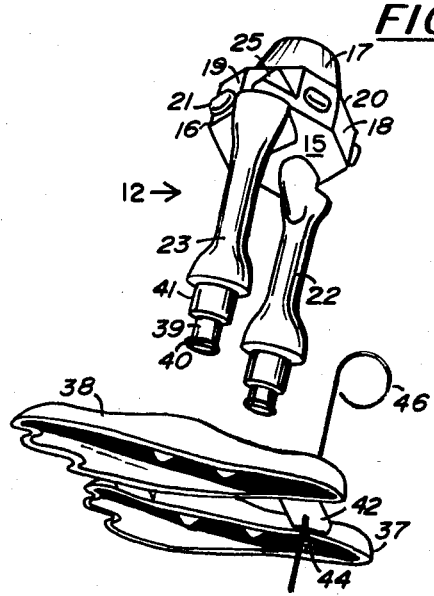
FIG. 5 is an oblique top view of a pair of feet shown in FIG. 2.

With reference to FIG. 5, the foot assembly comprising the feet 37 and 38 have a cross bar 42 between the heels of the feet and a cross bar 43 between the toes of the feet to provide a rigid stable base. Holes 44 and 45 down through the center of the bars 42 and 43 respectively permit the passage of wire stakes 46 as shown in FIG. 2. Usually individual stakes are adequate, but if required, a single piece of stiff wire bent into an inverted "U" may have the outer portions down through the holes 44 and 45 and an upper portion in contact with both of the bars 42 and 43.

What is claimed is:

1. A decoy comprising a body and a removable two-legged supporting assembly, said body being moderately flexible and compressible, the flexibility of said body requiring connection to said supporting assembly thereto to be spread in each of three dimensions within the central flexible bottom portion of said body a substantial distance compared with the dimension of said decoy for distributing forces as required for maintaining said decoy standing upright on said two-legged supporting assembly, said two-legged supporting assembly being quite rigid, said two-legged supporting assembly comprising a removable plug to provide said connection to said body, a pair of legs extending rigidly downward from opposite spaced portions on the bottom of said plug, and a substantial base attached to the lower ends of both of said legs, the dimensions of said plug in lateral cross section and in height being sufficient to extend said substantial distance in each of said three dimensions within said flexible bottom portion of said body, and said central flexible bottom portion of said body being recessed to form a socket having said substantial distance in each of said three dimensions for fitting tightly about said plug, said socket being open as viewed from the bottom and having a continuous top wall and continuous surrounding side wall for strength and distribution of forces, the outer lateral wall of said plug and the corresponding inside surface of said socket being practically vertical for a substantial distance within said bottom portion, and said plug being inserted by applying force thereto in a direction toward the center of said body.

2. A decoy as claimed in claim 1 wherein an adjacent portion of said practically vertical inside surface of said socket and an adjacent portion of said outside surface of said plug are shaped to be snapped firmly together, said adjacent portions of said surfaces having a protrusion from one of said adjacent portions and a notch in the other one of said adjacent portions, said protrusion and said notch being aligned such that said protrusion snaps tightly into said notch while said plug is inserted into said socket.

3. A decoy as claimed in claim 2 wherein said inside surface of said socket and said outside surface of said plug are similar polygons, said polygons having respective corresponding sides adjacent while said two-legged supporting assembly is desirably oriented and said plug is fully inserted into said socket, and each of a plurality of said adjacent corresponding sides having said adjacent portions with said notch and said aligned protrusion.

4. A decoy as claimed in claim 2 wherein said recess has a larger outer portion adjacent said bottom portion of said body for receiving said plug and a smaller inner portion centrally located above said outer portion to form a shoulder of said moderately flexible material between said outer and said inner portions, and said plug having a centrally located upward projecting portion fitting tightly into said smaller portion of said recess while said plug is fully inserted into said socket.

* * * * *